United States Patent Office 2,730,828
Patented Jan. 17, 1956

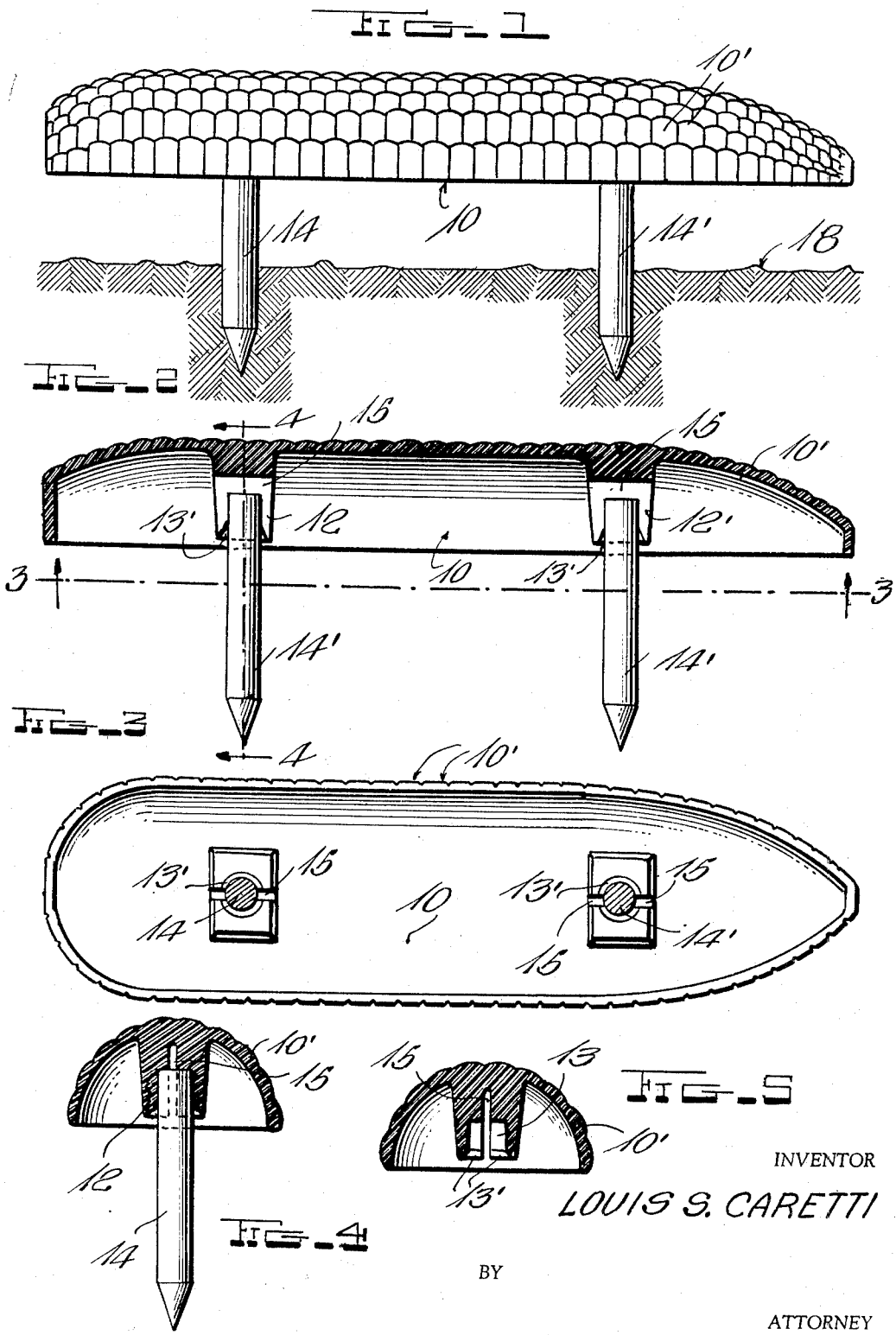

2,730,828

ARTIFICIAL BAIT

Louis S. Caretti, Baltimore, Md.

Application October 17, 1952, Serial No. 315,371

2 Claims. (Cl. 43—2)

The present invention relates to artificial bait for wild fowl, and particularly to a bait made to simulate food.

The object of the invention is to provide an imitation of the particular food, which will be more durable and which can be more conveniently stored and handled.

Another object of the invention is to provide an article that may be readily obtained from a sporting goods establishment where other types of artificial bait are handled for various types of game.

Still another object of the invention is to provide an article that would be free from deterioration and would not attract insects, mice and the like when not in use.

While several objects of the invention have been pointed out, other objects and advantages will appear as the nature of the invention is more fully disclosed, which consists in its novel construction as shown by the single sheet of drawings and as pointed out in the following detailed description in which:

Figure 1 is a view of the artificial bait in side elevation.

Figure 2 is a longitudinal cross-section of the article as shown in Figure 1.

Figure 3 is a bottom view of the same.

Figure 4 is a view taken along line 4—4 of Figure 3.

Figure 5 is a view similar to Figure 4 having the supporting pins removed.

Referring now in particular to the drawings, the bait comprises a shell 10 of semi-circular form in cross-section. The outer convexed surface is provided with a design of a plurality of corn kernels 10' together with the color of the corn, which is usually yellow, or white. The shell is made preferably of a plastic material and of a uniform thickness.

Extending along the center of the inner concaved side of the shell are two projections, or arbors 12 and 12'. These arbors extend downwardly from the center of the shell to a point just short of its bottom edge and are provided with apertures or holes 13, which are also perpendicular with the horizontal axis of the shell. The outer edge of the hole is slightly beveled at 13' to enable the supporting pins 14 and 14' to be more easily inserted. The arbor is also provided with a slot 15 to allow a slight expansion of the aperture which will provide a slight pressure on the head of the pin when it is forced into the aperture, which is made slightly smaller in diameter than the pin. While the shell is shown supported by two pins in combination with the arbors 12 and 12', the shell may be constructed so it may be supported by only one arbor, which would be located adjacent its center.

The supporting pins are conveniently made from 3/8" dowel sticks of approximately 4" in length, but may be made of any kind of suitable material. Generally, the pins are of such length as to support the shell about in the same position it would be in if it were fully round and lying flat on its side, that is, the length of the pins normally supporting the shell are approximately twice the length of the horizontal diameter of the shell.

In use the bait is placed on the ground as illustrated in Figure 1 and at the proper distance from a suitable shooting blind. The pins 14 and 14' are cut at the proper length and sharpened at one end. The flat end is forced into the apertures 13 provided in the arbors 12 and 12', which are of a tight fit to prevent the shell from becoming accidentally dislodged, or blown off in a high wind. After the pegs are inserted in the arbors, they are pushed into the ground a sufficient distance to hold the shell horizontally and in a fixed position. If the pins become frozen in the ground, as they sometimes do, the shell may be removed leaving the pins in the ground, as new pins can always be easily made, or furnished by using a standard size dowel stick.

As mentioned before, the shell including arbors, the apertures and slots may be cast in a single piece and therefore provide a structure of simple construction.

While a specific structure of the invention as shown and illustrated, it is not intended as a limitation of the invention, as various shapes, forms and designs may be made without departing from the spirit of the invention and its scope is best defined in the appended claims.

I claim:

1. An artificial bait for wild fowl comprising a longitudinally semi-circular shell, the convexed outside surface of which simulates an ear of corn, the inner surface portion of the shell being concaved to form a wall of substantially the same thickness throughout its area, a supporting means comprising arbors carried by the shell on its concaved inner side at the center of the shell and extending downwardly substantially perpendicular from the longitudinal axis of the shell, each arbor having an aperture extending upwardly therein for a predetermined distance for slidably receiving one end of a detachable peg, the arbors being slotted and the apertures being of a slightly smaller diameter than the peg to be used for providing a tight fit upon the peg when the same is forced into the arbor, whereby the shell may be maintained in a fixed position when the pegs are embedded in the ground.

2. An artificial bait for wild fowl comprising a semi-circular shell, the convexed outside surface of which is provided with a color and design to simulate an ear of corn, a supporting means for rigidly supporting the shell slightly above the ground with its convexed surface extending upwardly and in a horizontal position, the supporting means consisting of integrally formed recessed arbors extending downwardly from the central and inner surface of the shell to a point not greater than the depth of the shell each of said arbors being adapted to receive one end of a pin, of such length as to support the shell horizontally above the ground at a distance substantially that of twice the diameter of the shell.

References Cited in the file of this patent

UNITED STATES PATENTS

| | | |
|---|---|---|
| 830,009 | Salisbury | Sept. 4, 1906 |
| 2,291,944 | Bonanno | Aug. 4, 1942 |
| 2,585,174 | Rosendahl | Feb. 12, 1952 |

FOREIGN PATENTS

| | | |
|---|---|---|
| 389,522 | Great Britain | Mar. 20, 1933 |
| 611,844 | Great Britain | Nov. 4, 1948 |